(12) United States Patent
Sen

(10) Patent No.: US 6,353,270 B1
(45) Date of Patent: Mar. 5, 2002

(54) GRAVITATIONAL ENERGY SYSTEM (MOMENTUM TURBINE)

(75) Inventor: Asim K. Sen, Ottawa (CA)

(73) Assignee: Synchrosat Limited, Ottawa (CA)

( * ) Notice: Subject to any disclaimer, the term of this patent is extended or adjusted under 35 U.S.C. 154(b) by 0 days.

(21) Appl. No.: 09/541,038

(22) Filed: Mar. 31, 2000

(51) Int. Cl.⁷ .............................................. H02P 9/04
(52) U.S. Cl. ...................... 290/1 R; 290/1 A; 290/1 C; 290/45
(58) Field of Search ................ 290/1 A, 1 R, 290/1 C, 42

(56) References Cited

U.S. PATENT DOCUMENTS

| | | | | |
|---|---|---|---|---|
| 3,943,370 A | * | 3/1976 | Watanabe | 290/1 R |
| 4,239,975 A | * | 12/1980 | Chiappetti | 290/1 R |
| 4,250,395 A | * | 2/1981 | Lundgren | 290/1 R |
| 4,614,875 A | * | 9/1986 | McGee | 290/1 R |
| 4,657,289 A | * | 4/1987 | Boyer | 290/1 R |
| 4,739,179 A | * | 4/1988 | Stites | 290/1 R |

* cited by examiner

*Primary Examiner*—Elvin Enad

(57) ABSTRACT

This invention relates to a new and useful improvement of an earlier scheme patented by this inventor (Canadian Patent No. 1,245,992, issued Dec. 6, 1988) for generating electricity using gravitational energy. The improved scheme uses a set of massive underground spinning wheels, wherein each wheel is geared to a large driving wheel requiring a lower input torque, which wheel is then fitted with a mechanism to receive and transmit gravitational torque pulses from a passing vehicle to keep the wheels in motion. The above transmission mechanism consists of a stepping board, a cylindrical rod and a movable striking head with a toothed jaw attached to the lower end of the cylindrical rod by a hinge fitted with a torsional spring. The upper end of the cylindrical rod which protrudes above the ground surface is rigidly connected to the moving end of the stepping board and both are kept in their initial upward position by means of a "recocking" compression spring. Also, the upper jaw of the striking head which initially remains closed and attached with the cylindrical rod due to the spring pressure, is designed to rest on a set of matching teeth. The electricity is generated by using each spinning wheel in combination with an appropriate gear system to act as the prime mover of an alternator.

3 Claims, 1 Drawing Sheet

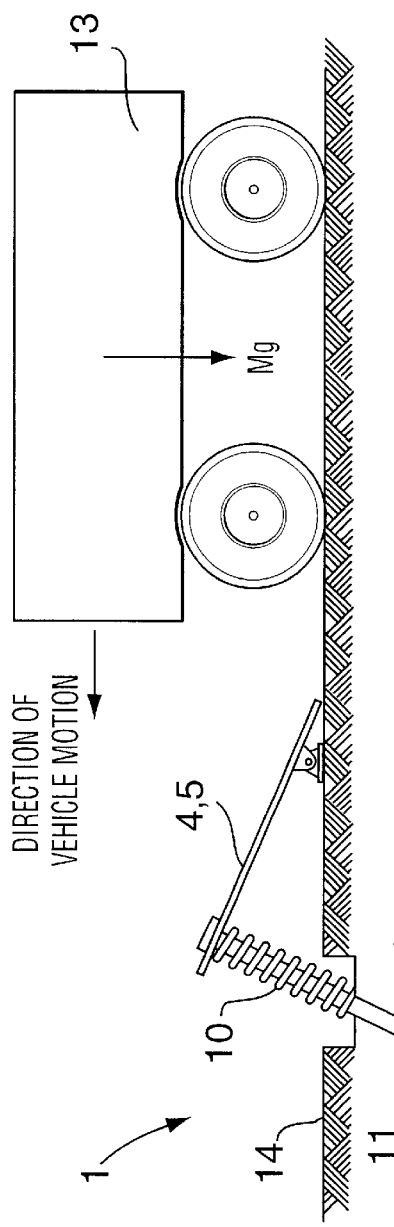
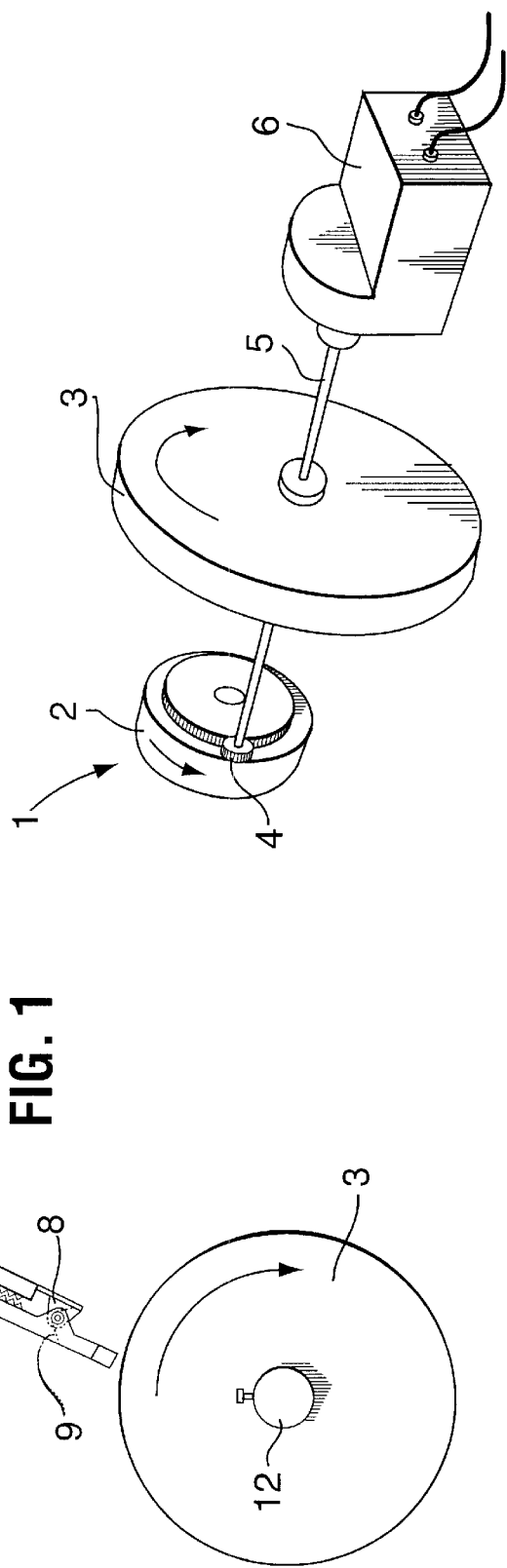
FIG. 1
FIG. 2

GRAVITATIONAL ENERGY SYSTEM (MOMENTUM TURBINE)

This invention relates to a new and useful improvement of the energy scheme as described by this inventor in Canadian Patent No. 1,245,992, issued on Dec. 6, 1988 and also in U.S. Pat. No. 4,980,572, issued on Dec. 25, 1990, but which U.S. Patent has now expired due to non-payment of maintenance fee.

The energy scheme described in the above-noted patents uses a massive underground wheel which is suitably disposed to receive torque pulses from a passing vehicle as a result of gravitational forces. This underground wheel in combination with an appropriate gear system will then act as the prime mover of an alternator which will produce the electricity. In a practical realization of this scheme, a number of such underground wheels and generator units will be placed along a circular path of the passing vehicle and this will then ensure that the electricity can be generated on a more stable and continuous basis.

As described in the above-noted patents, the transmission mechanism which is used to apply the gravitational torque to each underground wheel is comprised of a stepping board, a hollow cylindrical rod disposed vertically and a shoe attached to the lower end of the cylindrical rod by a hinge with the upper end of the rod protruding above the ground surface. The initial positioning of the shoe is accomplished by a linkage connecting the stepping board and the lower part of the shoe, the linkage being threaded along the central hole of the cylindrical rod. A pair of spring is also used to keep both the stepping board and the protruding end of the vertical rod in their initial upward positions.

The present disclosure relates to the improvements made in two specific areas of design of the earlier invention. One area of design changes involves the transmission mechanism which applies the gravitational torque to each underground wheel, while the other area concerns the design of a new drive unit for the generator shaft. It is believed that both design changes to the original energy scheme will result in increased efficiency and power gain in the overall system.

The new transmission mechanism described herein is comprised of a stepping board, a cylindrical rod and a movable striking head with a rubber tip, the striking head being attached to the lower end of the cylindrical rod by a hinge fitted with a torsional spring. The upper end of the cylindrical rod which protrudes above the ground surface is rigidly connected to the moving end of the stepping board, while a "recocking" compression spring is used to keep both the stepping board and the protruding end of the cylindrical rod in their initial upward position. Also, the striking head used has a jaw in its upper part which initially remains attached with one side of the cylindrical rod due to the spring pressure, resting on a set of matching teeth. The complete mechanism works as follows: When the stepping board is lowered by the weight of the passing vehicle, the lower end of the striking head with the rubber tip hits the wheel rim and causes the wheel to rotate. As the wheel begins to rotate, the built-in upper jaw associated with the striking head opens up to allow its lower end, still remaining in contact with the wheel rim, to move with the wheel until the applied gravitational torque is removed. The striking head then moves up to return to its initial position and the cycle is repeated again. The transmission mechanism as described herein is believed to be new and its use in the present scheme facilitates the conversion of gravitational energy into useful electrical power with much improved efficiency and increased power gain.

The new drive unit for the generator shaft is comprised of a massive wheel which is suitably coupled to a driving wheel of a much larger diameter by using torque-reduction gears. The driving wheel which will now require a much reduced torque to turn due to its large physical size as well as the special gear arrangement with the massive wheel, is fitted with the new and improved transmission mechanism to receive the gravitational torque directly from the passing vehicle. The driving wheel is also coupled directly to the generator shaft to rotate the shaft whenever the gravitational torque is applied by the passing vehicle.

As had been noted in the specification of the original patent (Can. Pat. No. 1,245,992), prior arts relating to the invention revealed several earlier patents. They include: W. P. LeVan (Can. Pat. No. 1,082,769, Jul. 29, 1980), A. Naito (Can. Pat. No. 1,025,048, Jan. 24, 1978), K. Sato (Japan Pat. No. 0008411, Jan., 1977), E. B. Wiggins (U.S. Pat. No. 1,916,873, Jul. 4, 1933), C. E. Toberman (U.S. Pat. No. 3,885,163, May 20, 1975), S. Martinez (U.S. Pat. No. 4,238,687, Dec. 9, 1980) and A. B. Chiappetti (U.S. Pat. No. 4,239,975, Dec. 16, 1980). But, in none of these earlier schemes, a massive wheel and the associated actuating mechanism have been used to extract gravitational energy from the weight of a passing vehicle. It is believed that the use of this massive wheel and also of the new and improved transmission mechanism and drive unit in the present scheme will not only ensure a more stable and continuous rotation of the generator shaft, but it will also result in increased efficiency and power gain in the overall system.

BRIEF DESCRIPTION OF THE DRAWINGS

FIG. 1 and FIG. 2 show diagramatic views of the invention.

DETAILED DESCRIPTION

Referring to FIG. 1, there is shown a gravitational energy system 1 comprised of an underground spinning wheel 3. The underground wheel 3 is suitably disposed to receive gravitational torque pulses from a passing vehicle 13. The torque pulses are applied by means of a transmission mechanism 4 composed of a stepping board 5, a cylindrical rod 6 and a movable striking head 7 with a rubber tip at its lower end. The upper end of the cylindrical rod 6 which protrudes above the ground surface 14 is rigidly connected to the moving end of the stepping board 5. The striking head 7 is attached to the lower end of the cylindrical rod 6 by a hinge 8 which is fitted with a torsional spring 9. A "recocking" compression spring 10 is used to keep both the stepping board 5 and the protruding end the cylindrical rod 6 in their initial upward position. The long toothed jaw in the upper part of the striking head 7 initially remains closed due to the pressure from spring 9, resting on a set of matching teeth 11 on the cylindrical rod 6. Finally, the underground wheel 3 is coupled to the prime mover of an alternator 12 through an appropriate gear arrangement.

Also, referring to FIG. 2, there is shown a new drive unit 1 for the generator shaft comprised of a massive wheel 2 which is suitably coupled, through use of torque-reduction gears4, to a driving wheel 3 having a much larger diameter. The driving wheel 3 which was referred to, in FIG. 1, as the underground spinning wheel and was fitted with the transmission mechanism, is now directly connected to the input shaft 5 of an alternator 6 to produce the electricity.

I claim:

1. A set of massive underground spinning wheels wherein each wheel is connected through use of torque-reduction gears to a driving wheel having a much larger diameter, each driving wheel being fitted with a transmission mechanism to receive and transmit gravitational torque pulses from a passing vehicle, the vehicle moving along a circular path with a constant velocity, the said transmission mechanism transmitting the torque pulses to each driving wheel by making momentary contacts at the wheel rim, being comprised of a stepping board, a cylindrical rod and a movable striking head with a rubber tip at its lower end, the striking head being attached to the lower end of the cylindrical rod by a hinge fitted with a torsional spring, a long toothed jaw in the upper part of the striking head initially remaining closed due to the spring pressure and resting on a set of matching teeth mounted on one side of the cylindrical rod, the closed jaw opening only to allow the lower end of the striking head touching the wheel rim to move with the wheel when the gravitational torque pulses are applied by the transmission mechanism to keep the wheels in motion, each driving wheel being coupled to act as the prime mover of an alternator through an appropriate gear arrangement to produce electricity.

2. The set of massive underground spinning wheels of claim 1 wherein the path of the passing vehicle is an ordinary roadway.

3. The set of massive underground spinning wheels of claim 1 wherein the path of the passing vehicle is a city beltway.

* * * * *